H. W. PLEISTER.
CONDUIT OR CABLE CLAMP AND BRIDLE RING.
APPLICATION FILED AUG. 17, 1920.
1,381,233.
Patented June 14, 1921.
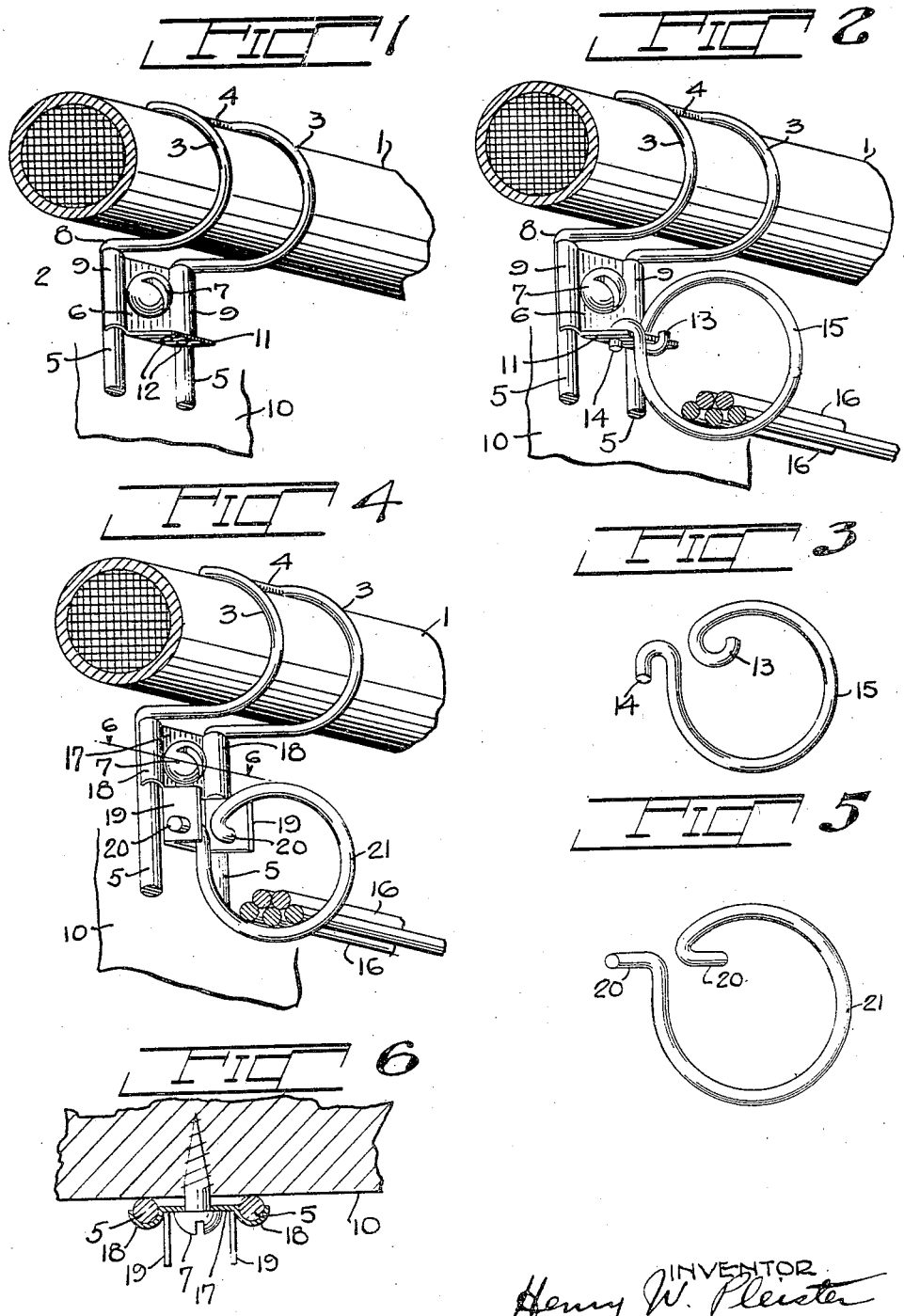

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,381,233.  Specification of Letters Patent.  Patented June 14, 1921.

Application filed August 17, 1920. Serial No. 404,175.

*To all whom it may concern:*

Be it known that I, HENRY W. PLEISTER, a citizen of the United States, residing at Westfield, in the county of Union and State of New Jersey, have made certain new and useful Improvements in Conduit or Cable Clamps and Bridle-Rings, of which the following is a specification, taken in connection with the accompanying drawings.

My invention relates to a conduit or cable clamp and more particularly to one formed from wire. It further relates to the combination of such a wire conduit or cable clamp and a saddle provided with means to support a bridle ring. My invention further relates to the combination of such a clamp with a bridle ring.

In the figures, in which I have shown one embodiment of my invention, the same reference numerals refer to several parts in the several figures.

Figure 1 is a perspective view of my wire bridle ring and saddle shown supporting a cable;

Fig. 2 is a perspective view, similar to Fig. 1, with the addition of a bridle ring supported by the saddle;

Fig. 3 is a perspective view of the form of bridle ring shown in Fig. 2;

Fig. 4 is a perspective view of a wire conduit or cable clamp with a modified form of saddle, and with a different form of bridle ring supported by the saddle;

Fig. 5 is a perspective view of the bridle ring shown in Fig. 4;

Fig. 6 is a horizontal section on the line 6—6 of Fig. 4.

Prior to my invention it has been customary to support the heavy lead covered conduits or cables 1 by means of cable clamps formed from heavy castings of iron or similar metal, and also by cable clamps formed from pressed sheet steel. By my invention I form a much cheaper conduit or cable clamp which will do the heavy duty required to support the heavy lead covered cables and which will not bend or break under the heavy normal strains, nor will it fail under abnormal strains due to sleet, wind and ice.

In my invention I form a wire conduit or cable clamp 2 by bending a single strand of wire back upon itself forming the wire hooks 3, 3 and the connecting member 4. The free ends of the wire are then further bent and brought parallel with each other forming the arms 5, 5 which arms form the base of my conduit or cable clamp. The cable 1 is supported on the hooks 3, 3 by means of the saddle 6 and securing screw 7. The saddle is provided with bent portions 9, 9 to engage over the arms 5, 5 and prevent the lateral displacement of said arms, when the screw 7 is screwed into the wall or other suitable support 10.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I support the bridle ring upon the saddle. By way of example I have shown two methods of so supporting the bridle ring, though of course it is to be understood that these are merely illustrative.

Whenever the traffic load becomes excessive and the telephone engineers desire to increase the capacity of the installation, this may be readily done in my invention by connecting a bridle ring to the particular form of saddle used.

For example in Fig. 1, I have provided a saddle 6 with a wing 11 having holes 12, 12 for the reception of the hooks 13 and 14 of the bridle ring 15. In positioning the parts, the hook 13 is hooked in the one of the holes 12 and then the bridle ring 15 is slightly compressed so as to bring the hook 14 above the wing 11 which will permit the end of the hook to snap into the other hole 12 as shown in Fig. 2. The bridle wires 16, 16 can then be strung through the bridle ring 15, as shown in Fig. 2.

Whenever it is desired to remove the bridle ring and the runs of bridle wires 16, 16, this can be easily done by compressing the bridle ring so that the hook 14 may be forced out of the wing 11. This will permit the other hook 13 to be readily disconnected. The bridle ring and the runs of bridle wires can then be used in other locations if desired.

Instead of using a saddle such as shown in Figs. 1 and 2, I may employ a saddle 17, Fig. 4, having the bent portions 18, 18 and the two wings 19, 19. Each of these wings is provided with an opening to receive the arms 20, 20 of the bridle ring 21, Fig. 5. One of the arms 20 can be positioned and then by simple manipulation the other arm 20 can be brought into position where it will spring into the aperture or hole in the other wing 19 as shown in Fig. 4. To disconnect the parts it is simply necessary to reverse the operation above set forth.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a wire conduit or cable clamp and a saddle provided with a wing having openings to receive the two ends of a bridle ring, and a bridle ring having its ends detachably held in the openings in said wing.

2. The combination of a wire conduit or cable clamp and a saddle, the saddle being provided with means to hold in the same horizontal plane both ends of a bridle ring.

3. The combination of a wire conduit or cable clamp and a saddle having a wing and a bridle ring having means to hook both of its ends in said wing.

4. The combination of a wire conduit or cable clamp and a saddle having a wing and a bridle ring having reversed hooks at its two ends to hook on both sides of said wing.

HENRY W. PLEISTER.

Witnesses:
MARY R. RYAN,
ELIZABETH J. ROTH.